No. 780,156. PATENTED JAN. 17, 1905.
G. BURR.
CLUTCH.
APPLICATION FILED JULY 1, 1904.
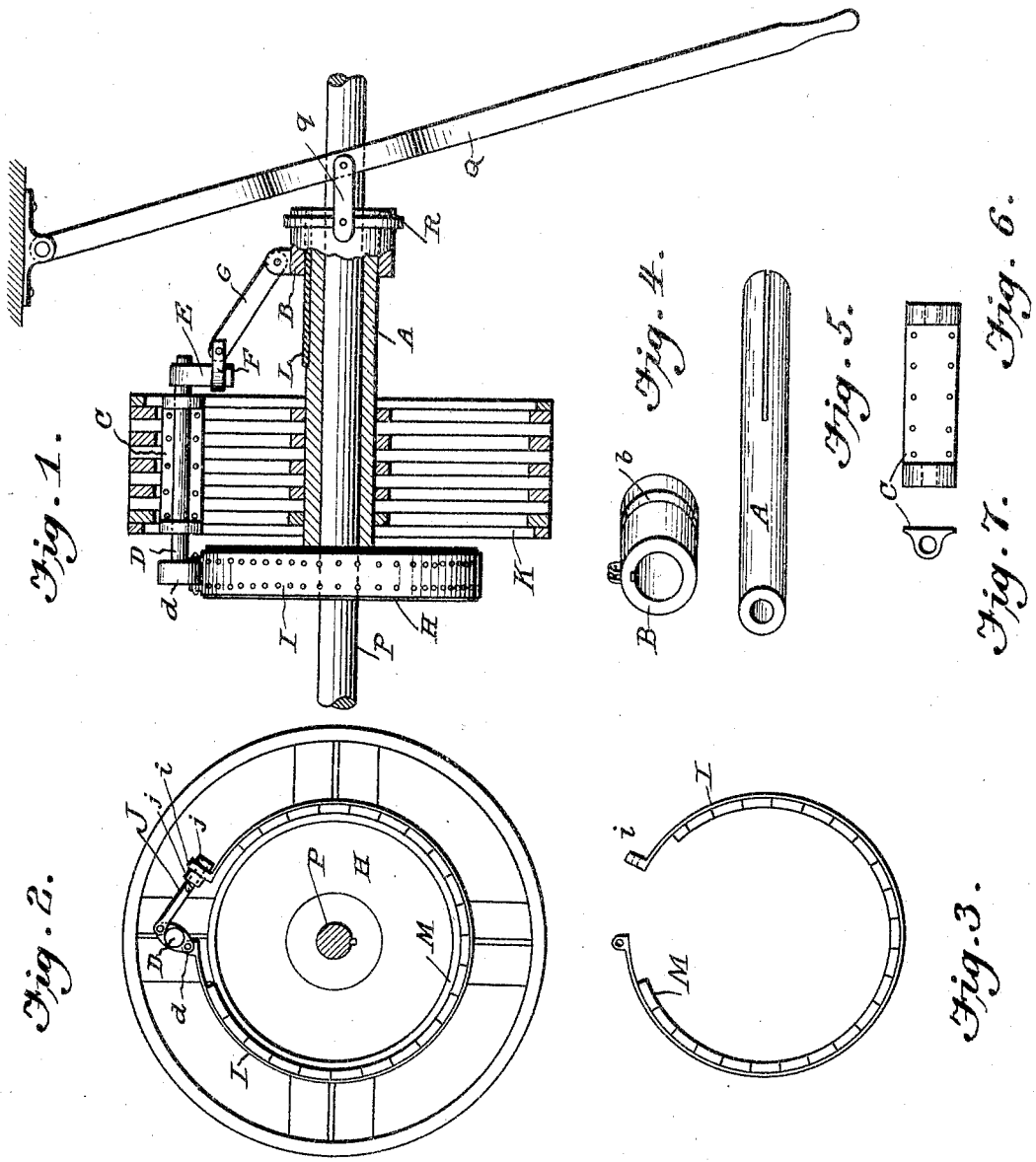
Witnesses
M. A. Schmidt
E. F. Camp
Inventor
Gustav Burr,
by Milo B. Stevens & Co.
Attorneys No. 780,156.  
Patented January 17, 1905.

UNITED STATES PATENT OFFICE.

GUSTAV BURR, OF CHICAGO, ILLINOIS.

CLUTCH.

SPECIFICATION forming part of Letters Patent No. 780,156, dated January 17, 1905.

Application filed July 1, 1904. Serial No. 214,963.

*To all whom it may concern:*

Be it known that I, GUSTAV BURR, a citizen of the United States, residing at Chicago, in the county of Cook and State of Illinois, have invented new and useful Improvements in Clutches, of which the following is a specification.

This invention is a friction-clutch, and particularly a band-clutch, suitable for coupling fast and loose pulleys on the same or different shafts, and it embodies a novel construction suitable for line or other shafts of high or low speed. The arrangement is such that the parts may be adjusted or applied to pulleys of various sizes, and it has very quick action and large friction-surface.

In the accompanying drawings, Figure 1 is a sectional elevation of the device. Fig. 2 is an end elevation showing the same. Fig. 3 is a detail of the band. Fig. 4 is a detail in perspective of a sliding collar. Fig. 5 is a detail in perspective of the sleeve on which the collar slides and on which the driven or loose pulley is mounted. Figs. 6 and 7 are details in plan and end views of a casting which is carried by the loose pulley.

Referring specifically to the drawings, P indicates the line or driving-shaft, carrying thereon the fast pulley H, from which motion is communicated to the loose or driven pulley K. This pulley K is fast upon a sleeve A, which is loose on the shaft.

I indicates a band which extends around the rim of the pulley H and is faced on the inside with wooden blocks M. At its ends the band is connected to opposite arms $d$, projecting from a rocker D, which is carried in bearings on the plate C, bolted to the spoke or arm of the pulley K, which is preferably of the wood split kind. The connection between one end of the band I and one of the arms $d$ is by means of a bolt J, the head of which is forked for pivotal connection with the arm $d$ and the stem of which extends through an end piece $i$ on the band and is threaded to receive adjusting-nuts $j$, whereby the band may be properly adjusted to the pulley H to take up wear or otherwise. The rocker D extends across the pulley K parallel to the axis of the main shaft, and the casting C, by which it is carried, may be adjusted or bolted at any place on the frame or spoke of the pulley at various distances from the shaft, so as to permit of its use with various sizes of pulleys, either fast or loose. The rocker D is turned by a crank-arm E and a piece F and a link G, which is pivotally connected to a collar B, which is slidable lengthwise on the sleeve A, relative rotary movement being prevented by a long key L between the two.

The hand-lever to operate the clutch is indicated at Q. It is bowed to span the shaft and is connected by links $q$ to a ring R, fitting loosely in a groove $b$ in the piece B.

In operation to throw the clutch in gear the collar B is forced toward the pulleys. This turns the rocker D, and the arms $d$ pull the opposite ends of the band and tighten the same against the fast pulley H, which by the connection thus established carries with it the loose pulley K, the sleeve A turning on the shaft P. The disconnection is effected by opposite movement in an obvious manner.

This clutch can be used to couple two pulleys on the same shaft or on two shafts lined up endwise to each other. The collar B can be made in half-sections, so that the clutch can be put on the shaft without taking down the same or removing the pulleys. The parts are few and simple, and inasmuch as the location of the casting C is optional at greater or less distance from the main shaft the device can be constructed and applied to pulleys of various sizes.

What I claim as new, and desire to secure by Letters Patent, is—

The combination with a driving and a driven pulley arranged in axial alinement, of a rocker carried by the latter and extending across the same parallel to its axis, and adjustable radially with respect thereto, said rocker having on one end oppositely-extending arms over the driving-pulley, a band connected at its ends to said arms and extending around said driving-pulley, and means to turn the rocker.

In testimony whereof I have signed my name to this specification in the presence of two subscribing witnesses.

GUSTAV BURR.

Witnesses:
 ELSA PROSCHE,
 H. G. BATCHELOR.